(12) United States Patent
Liu et al.

(10) Patent No.: US 7,305,406 B2
(45) Date of Patent: Dec. 4, 2007

(54) COMPUTER AIDED AUTHORING, ELECTRONIC DOCUMENT BROWSING, RETRIEVING, AND SUBSCRIBING AND PUBLISHING

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/016,594

(22) Filed: Dec. 17, 2004

(65) Prior Publication Data

US 2005/0154702 A1 Jul. 14, 2005

(30) Foreign Application Priority Data

Dec. 17, 2003 (CN) .................... 2003 1 0121287

(51) Int. Cl.
*G06F 17/00* (2006.01)
*G06F 7/00* (2006.01)
(52) U.S. Cl. .................... 707/101; 707/1; 707/100
(58) Field of Classification Search ................ 707/101, 707/100, 1
See application file for complete search history.

(56) References Cited

U.S. PATENT DOCUMENTS

| 2001/0044795 | A1 | 11/2001 | Cohen | |
|---|---|---|---|---|
| 2002/0143739 | A1* | 10/2002 | Makino et al. | 707/1 |
| 2004/0093328 | A1* | 5/2004 | Damle | 707/3 |

FOREIGN PATENT DOCUMENTS

WO        WO 01/56388 A2    8/2001

* cited by examiner

*Primary Examiner*—Sam Rimell
*Assistant Examiner*—Jacob F. Betit
(74) *Attorney, Agent, or Firm*—Louis P. Herzberg (57) ABSTRACT

Provides methods, apparatus, and systems for computer aided authoring. Included are: a method for browsing an electronic document, an apparatus for aided authoring, an electronic document browser, a method for retrieving an electronic document, a system for retrieving electronic documents, a method for subscribing and publishing an electronic document as well as a system for subscribing and publishing electronic documents. An example method for computer aided authoring includes: generating one or more topic summaries based on an electronic document while a writer is writing said electronic document, wherein the reliability of the topic summary is ensured by the writer; and saving said topic summary information in correspondence with said electronic document.

6 Claims, 9 Drawing Sheets

COMPUTER AIDED AUTHORING, ELECTRONIC DOCUMENT BROWSING, RETRIEVING, AND SUBSCRIBING AND PUBLISHING

TECHNICAL FIELD

The present invention relates to data processing techniques, in particular, to the techniques of computer aided authoring, electronic document browsing and retrieving, as well as electronic document subscribing and publishing.

TECHNICAL BACKGROUND

In the past, document writing tools used by document writers are independent from document management and retrieving tools that users use; that is, the writer does not care how the reader will retrieve and leverage the content written by him/her when he/she prepares it. While at the same time, from the information-accessing point of view, users would feel great challenge to get things they really want.

Moreover, at present, computer's capability to understand natural languages is still at a level of word understanding, while for the document management and retrieving tools, there is a need of understanding and semantic capabilities for sentences and even the whole document so as to really satisfy users' requirements. Consequently, according to the present speed in technical development, it is believed that the current document writing, managing and retrieving technology will not be able to evolve to meet the user's information accessing requirements.

SUMMARY OF THE INVENTION

Therefore, in order to solve the problem mentioned above, the present invention provides that the writer is enabled to prepare related information for subsequent document management and retrieval while he is writing the document; that is, there are a set of tools available at the writer's hand for him to conveniently contribute to user's subsequent searching and previewing, more particularly, to prepare a topic summary. In text retrieving, a topic summary will help the user to evaluate the relevance of retrieving results rapidly; and in information service and browsing, a topic summary will help publish contents in various ways, such as publish to PDAs, mobile telephones and so on.

According to one aspect of the present invention, there is provided a method for computer aided authoring, comprising: during a writer is writing an electronic document, generating one or more topic summaries based on said document; and saving said summary information in correspondence with said electronic document.

According to another aspect of the present invention, there is provided a method for browsing an electronic document, comprising: reading topic summary information saved in correspondence with the electronic document, wherein said topic summary information contains one or more topics and corresponding topic summaries; presenting said topic summary to a user; and presenting the content of said document to the user when the user confirms said topic summary.

According to yet another aspect of the present invention, there is provided an apparatus for aided authoring, comprising: an electronic document editing unit for editing an electronic document; a summary generation unit for extracting a topic summary from said electronic document according to an input topic; and a summary saving unit for saving the topic summary information generated by said summary generation unit in correspondence with said electronic document.

According to still another aspect of the present invention, there is provided an electronic document browser, comprising: a topic summary reading unit for reading topic summary information saved in correspondence with said electronic document being browsed, said topic summary information contains one or more topics and corresponding topic summaries; and a topic summary presenting unit for presenting the topic summaries contained in said topic summary information to a user.

According to still another aspect of the present invention, there is provided a method for retrieving electronic documents, comprising: extracting multiple pieces of topic summary information corresponding to a plurality of electronic documents respectively, wherein each piece of said topic summary information contains one or more topics and their corresponding topic summaries; indexing the topics in said extracted topic summary information; inputting a query by a user; searching said topic index for one or more topics that are closest to the user input query; presenting said one or more closest topics and their corresponding topic summaries to said user; and providing said user with an electronic document or its link corresponding to a topic summary selected by the user.

According to still another aspect of the present invention, there is provided a method for retrieving electronic documents, comprising: when one or more electronic documents are found according to an user's query, reading topic summary information corresponding to said found electronic documents, wherein each piece of said topic summary information contains one or more topics and their corresponding topic summaries; presenting the user with a topic summary of a topic that is closest to said user's query, from said topic summary information; and providing said user with the electronic document or its link corresponding to the topic summary selected by the user.

According to still another aspect of the present invention, there is provided a system for retrieving electronic documents, comprising: a topic summary information extraction means, for extracting multiple pieces of topic summary information corresponding to a plurality of electronic documents, respectively, wherein each piece of said topic summary information contains one or more topics and their corresponding topic summaries; a topic indexing means for indexing the topics in said extracted topic summary information; a topic index library for storing topic index prepared by said topic indexing means; a topic searching means for searching said topic index for one or more topics that are closest to a user input query; a topic summary presentation means for presenting said user with one or more topics found by said topic searching means and their corresponding topic summaries; and an electronic document providing means for providing said user with an electronic documents or its link corresponding to a topic summary selected by said user.

According to still another aspect of the present invention, there is provided a system for retrieving electronic documents, which is used for searching one or more electronic documents according to a user's query, said system comprising: a topic summary reading means for reading topic summary information corresponding to said found electronic documents, wherein each piece of topic summary information contains one or more topics and their corresponding topic summaries; a topic summary presentation means for presenting said user with a topic summary of a topic that is closest to said user's query, from said topic summary information; and an electronic document providing means for providing said user with an electronic document or its link corresponding to a topic summary selected by said user.

According to still another aspect of the present invention, there is provided a method for subscribing and publishing electronic documents, comprising: setting a profile for a subscriber, which contains subscribed topics required by said subscriber; extracting multiple pieces of topic summary information corresponding to a plurality of electronic documents, respectively, wherein each piece of said topic summary information contains one or more topics and their corresponding topic summaries; selecting related topics and their corresponding topic summaries, according to the subscribed topics in said subscriber's profile; and publishing the selected topic summaries to said subscriber.

According to still another aspect of the present invention, there is provided a system for subscribing and publishing electronic documents, comprising: a subscriber profile storage means for storing a profile of a subscriber that contains a subscribed topics desired by said subscriber; a topic summary information extraction means for extracting multiple pieces of topic summary information corresponding to a plurality of electronic documents, respectively, wherein each piece of said topic summary information contains one or more topics and their corresponding topic summaries; a topic selecting means for selecting related topics and their corresponding topic summaries, according to the subscribed topic in said subscriber's profile; and a publishing means for publishing the topic summaries selected by said topic selecting means to said subscriber.

BRIEF DESCRIPTION OF THE DRAWINGS

The above and other aspects, features, and advantages of the present invention will become more apparent from the following detailed description when taken in conjunction with the accompanying drawings, in which.

DETAILED DESCRIPTION OF THE INVENTION

Therefore, in order to solve the problem mentioned above, the present invention provides that the writer is enabled to prepare related information for subsequent document management and retrieval while he is writing the document; that is, there are a set of tools available at the writer's hand for him to conveniently contribute to user's subsequent searching and previewing, more particularly, to prepare a topic summary. In text retrieving, a topic summary will help the user to evaluate the relevance of retrieving results rapidly; and in information service and browsing, a topic summary will help publish contents in various ways, such as publish to PDAs, mobile telephones and so on.

In an example embodiment of the present invention, there is provided a method for computer aided authoring, comprising: during a writer is writing an electronic document, generating one or more topic summaries based on said document; and saving said summary information in correspondence with said electronic document.

In an example embodiment of the present invention, there is provided a method for browsing an electronic document, comprising: reading topic summary information saved in correspondence with the electronic document, wherein said topic summary information contains one or more topics and corresponding topic summaries; presenting said topic summary to a user; and presenting the content of said document to the user when the user confirms said topic summary.

In an example embodiment of the present invention, there is also provided an apparatus for aided authoring, comprising: an electronic document editing unit for editing an electronic document; a summary generation unit for extracting a topic summary from said electronic document according to an input topic; and a summary saving unit for saving the topic summary information generated by said summary generation unit in correspondence with said electronic document.

In an example embodiment of the present invention, there is also provided an electronic document browser, comprising: a topic summary reading unit for reading topic summary information saved in correspondence with said electronic document being browsed, said topic summary information contains one or more topics and corresponding topic summaries; and a topic summary presenting unit for presenting the topic summaries contained in said topic summary information to a user.

In an example embodiment of the present invention, there is also provided a method for retrieving electronic documents, comprising: extracting multiple pieces of topic summary information corresponding to a plurality of electronic documents respectively, wherein each piece of said topic summary information contains one or more topics and their corresponding topic summaries; indexing the topics in said extracted topic summary information; inputting a query by a user; searching said topic index for one or more topics that are closest to the user input query; presenting said one or more closest topics and their corresponding topic summaries to said user; and providing said user with an electronic document or its link corresponding to a topic summary selected by the user.

In an example embodiment of the present invention, there is also provided a method for retrieving electronic documents, comprising: when one or more electronic documents are found according to an user's query, reading topic summary information corresponding to said found electronic documents, wherein each piece of said topic summary information contains one or more topics and their corresponding topic summaries; presenting the user with a topic summary of a topic that is closest to said user's query, from said topic summary information; and providing said user with the electronic document or its link corresponding to the topic summary selected by the user.

In an example embodiment of the present invention, there is also provided a system for retrieving electronic documents, comprising: a topic summary information extraction means, for extracting multiple pieces of topic summary information corresponding to a plurality of electronic documents, respectively, wherein each piece of said topic summary information contains one or more topics and their corresponding topic summaries; a topic indexing means for indexing the topics in said extracted topic summary information; a topic index library for storing topic index prepared by said topic indexing means; a topic searching means for searching said topic index for one or more topics that are closest to a user input query; a topic summary presentation means for presenting said user with one or more topics found by said topic searching means and their corresponding topic summaries; and an electronic document providing means for providing said user with an electronic documents or its link corresponding to a topic summary selected by said user.

In an example embodiment of the present invention, there is also provided a system for retrieving electronic documents, which is used for searching one or more electronic documents according to a user's query, said system comprising: a topic summary reading means for reading topic summary information corresponding to said found electronic documents, wherein each piece of topic summary information contains one or more topics and their corresponding topic summaries; a topic summary presentation means for presenting said user with a topic summary of a topic that is closest to said user's query, from said topic summary information; and an electronic document providing means for providing said user with an electronic document or its link corresponding to a topic summary selected by said user.

In an example embodiment of the present invention, there is also provided a method for subscribing and publishing electronic documents, comprising: setting a profile for a subscriber, which contains subscribed topics required by said subscriber; extracting multiple pieces of topic summary information corresponding to a plurality of electronic documents, respectively, wherein each piece of said topic summary information contains one or more topics and their corresponding topic summaries; selecting related topics and their corresponding topic summaries, according to the subscribed topics in said subscriber's profile; and publishing the selected topic summaries to said subscriber.

In an example embodiment of the present invention, there is also provided a system for subscribing and publishing electronic documents, comprising: a subscriber profile storage means for storing a profile of a subscriber that contains a subscribed topics desired by said subscriber; a topic summary information extraction means for extracting multiple pieces of topic summary information corresponding to a plurality of electronic documents, respectively, wherein each piece of said topic summary information contains one or more topics and their corresponding topic summaries; a topic selecting means for selecting related topics and their corresponding topic summaries, according to the subscribed topic in said subscriber's profile; and a publishing means for publishing the topic summaries selected by said topic selecting means to said subscriber.

Next, detailed description will be given to advantageous embodiments of the present invention with reference to the drawings.

Method for Computer Aided Authoring

Figure 1:
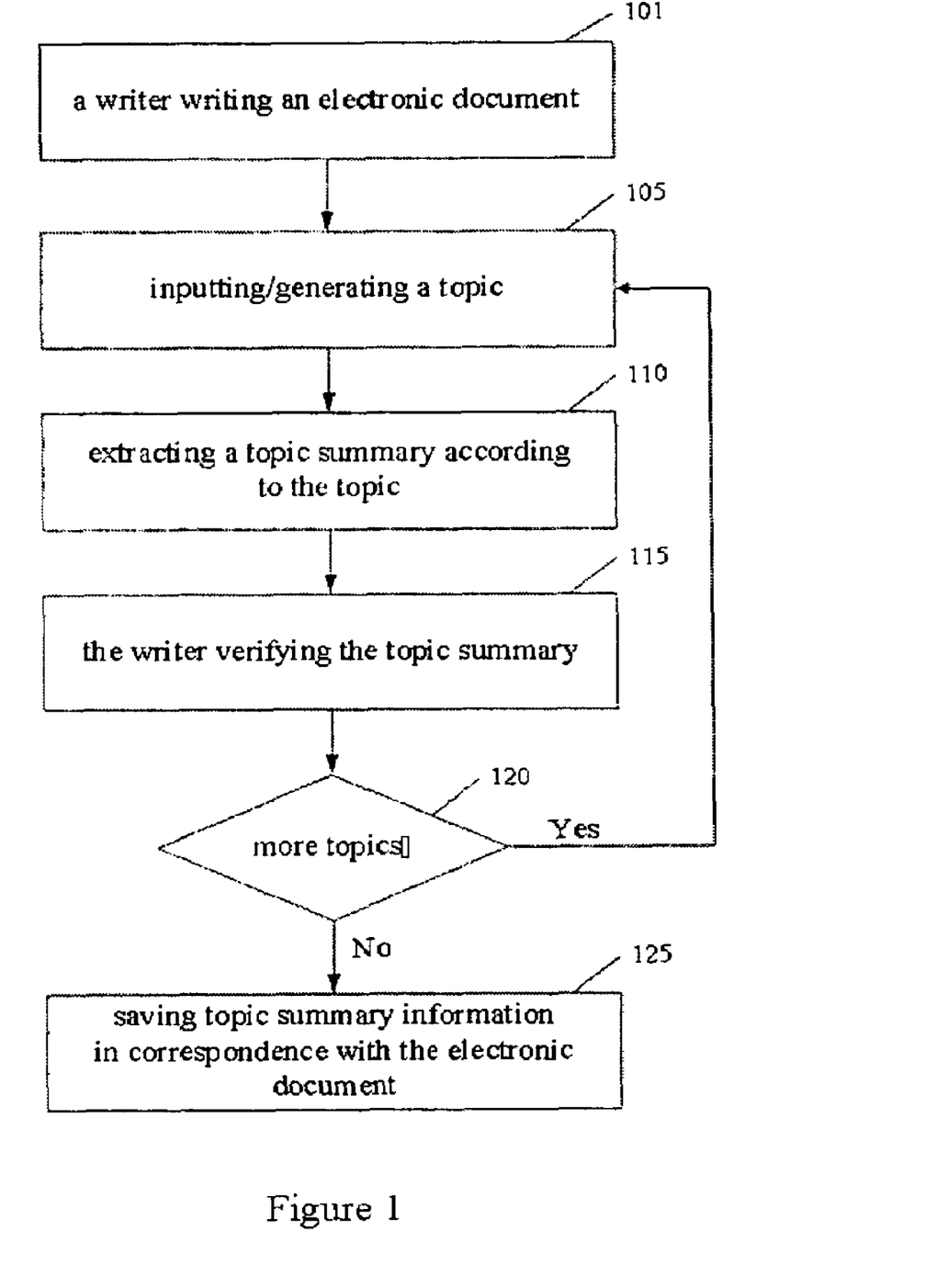
FIG. 1 is a flowchart showing a method for computer aided authoring according to an embodiment of the present invention.

According to one aspect of the present invention, there is provided a method for computer aided authoring. FIG. 1 is a flowchart showing the method for computer aided authoring according to an embodiment of the present invention. As shown in FIG. 1, first at step 101, a writer writes an electronic document. Usually, generation of a topic summary is performed after the writer has completed a document. Of course, generation of a topic summary may also be performed when a portion of a document (such as a chapter) has been completed according to the practical situation.

Next, at step 105, a topic is inputted by the writer, or automatically generated by means of an algorithm, based on the document being written. Here, a topic may be one or more keywords or natural language (NL) queries, wherein the terms without stop words are referred to as topic terms. Preferably, the topic is input by the writer, because the writer can choose a topic which best represents the main content of the document according to his writing intention. If the topic is generated automatically, it may be generated in terms of occurrence frequencies of the terms in the document or other information extracting techniques.

Next, at step 110, a topic summary is extracted from the electronic document (or document segment) according to the topic. According to an embodiment of the present invention, a method having following steps can be used to extract a topic summary for the topic:

a) the importance (weight) of each term (except stop word) in the document (or document segment) is calculated, for instance by using tf-idf method (see equation (1)):

$$w_j = tf \cdot idf \tag{1}$$

in equation (1), tf is the frequency (times of occurrence) of the term in the document, idf=all_sentences/term_sentences; here all_sentences is the number of all sentences in the document, and term_sentences is the number of sentences which contain the given term;

b) the importance of each sentence is calculated, i.e. summing up the weights of all terms in it, such as by equation (2):

$$value_i = \sum_{w_j \in S_i} w_j \tag{2}$$

c) the relevance of each sentence in the document to said topic is calculated, such as, by using the following equation (3):

$$score_i = \frac{n^2}{q} \tag{3}$$

in equation (3), n is the number of topic terms in the sentence, and q is the number of topic terms in the topic;

d) the above-mentioned importance of a sentence and its relevance to the topic are combined to calculate the final ranking value for each sentence by, for instance, the following equation (4):

$$r_i = \lambda \cdot score_i + (1-\lambda) \cdot value_i \tag{4}$$

in equation (4), λ is a coefficient ranging between 0 and 1 for adjusting the ratio in combining the importance of a sentence and its relevance; according to a preferred embodiment of the present invention, it may be set to 0.9 to emphasize the relevance to the topic; and e) a predetermined number of sentences with maximum final ranking values calculated as mentioned above are selected as the topic summary.

It should be understood that the above-described method is only an illustrated example of the method for extracting a topic summary. There are various other methods for extracting a summary based on a topic, for example, directly listing the sentences that contain topic terms, generating a summary by using a template, and so on, most of which methods are also applicable to the present invention. And, although equations (1)-(4) for calculating sentence importance, relevance and final ranking values have been illustrated here, the forms of these equations and coefficients thereof can be varied.

Furthermore, when a summary is generated based on a topic, various techniques for improving the readability of the summary can be utilized, for example, the co-applicant Chinese patent application entitled "method and apparatus for improving readability of summaries generated automatically by machines" (application number: 200310101752.9), which is entirely incorporated herein by reference.

Turning back to FIG. 1, subsequently at step 115, the topic summary is verified by the writer. Here, "verification" includes the writer's reviewing and modifying the generated topic summary, so as to ensure that the final topic summary will reflect the content of the document accurately and completely.

Next, at step 120, a determination is made as to whether it is required to generate topic summaries for more topics. Usually, the content of a document may have many aspects, and also the readers may have different purposes when searching and reading a document. Thus, if in this step it is determined that there are still more topics to be reflected, then the process will return to step 105, inputting next topic and extracting a summary corresponding to the topic; if there is no more topic for which the summary is to be extracted, the process will proceed to step 125.

At step 125, the topic summary information is saved in correspondence with the electronic document. Particularly, according to a preferred embodiment of the present invention, the topic summary information may be saved together with the electronic document as a knowledge tag. For instance, an electronic document is attached at its bottom by the following:

<TopicSummary>
<Topic1>Rocket</Topic1>
<Summary1> Yao Ming scored all 18 of his points in the first half and reserve Maurice Taylor had 11 of his 17 points in the fourth quarter in the Houston Rockets' 105-90 victory over the Los Angeles Clippers 105-90 Monday night. </Summary1>
<Topic2>Laker</Topic2>
<Summary2> Kobe Bryant scored 28 points, Karl Malone had 20 points and 10 rebounds and Gary Payton added 17 points and 10 assists to lead the Los Angeles Lakers to a 121-89 drubbing of the Memphis Grizzlies on Sunday night. </Summary2>
</TopicSummary>

Alternatively, a tag type of the knowledge tag of the topic summary can be defined at the header of an electronic document, and in the text of the electronic document, the tag is used to indicate which sentence should be included in the summary.

As described above, the present invention is not limited to a specific way in which the topic summary information is saved. For instance, it may be saved together with the electronic document, that is, as a part of the electronic document, or may be saved separately, as long as it is saved in correspondence with the electronic document.

From the above description it can be appreciated that if the method for aided authoring of the present invention is implemented, it is possible to assist the writer to complete the preparation of a plurality of topic summaries while the writer is writing. Without too much burden to the writer, the writer's understanding to the document (it is definitely the most accurate understanding) can be used to ensure the accuracy and readability of the generated topic summary. And, because a plurality of topic summaries can be generated for a document so as to sufficiently reflect the content of the document (for instance, in a report about NBA there may include description about several teams, such as Rocket, Lakers and Bull, and a plurality of players), such that summaries may be generated for corresponding topics. Thus, when the topic summary information is used for retrieving and previewing, it can be more accurate and complete, so that high degree of satisfaction can be obtained from users.

In addition, according to an embodiment of the present invention, after writer's verification of the topic summary, an evaluation is made on the topic summary that has been verified and modified by the writer, so as to ensure its reliability. Particularly, a plurality of summary generation methods (summary engines) may be used to generate a plurality of summaries, and relevance degrees of these summaries with the summary verified by the writer may be calculated respectively, and a weighting sum of these relevance degree values is used as a measure of the accuracy of the verified summary. Furthermore, in the following step 125, the information on the accuracy is also saved as a part of the topic summary information. Thus, the reliability of a topic summary can be reflected objectively.

Method for Browsing an Electronic Document

Under the same inventive conception, according to another aspect of the present invention, there is provided a method for browsing an electronic document, the electronic document is the document generated through the above described method for computer aided authoring, that is, topic summary information has been saved in correspondence with the document.

Figure 2:
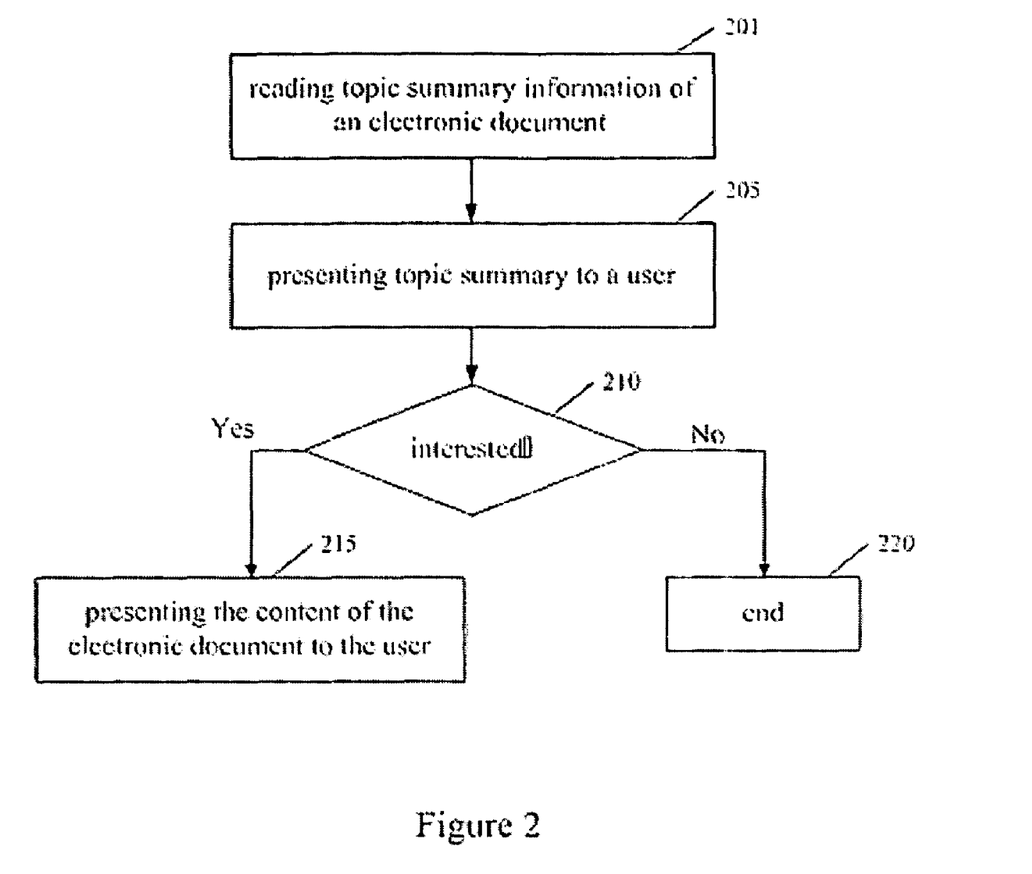
FIG. 2 is a flowchart showing a method for browsing an electronic document according to an embodiment of the present invention.

FIG. 2 is a flowchart showing the method for browsing an electronic document according to an embodiment of the present invention. As shown in FIG. 2, first at step 201, the topic summary information of the electronic document is read out. Particularly, according to the way in which the topic summary information is saved, the topic summary information is read out. For instance, if the topic summary information is saved at the bottom of the document as a knowledge tag, then the knowledge tag is identified and the information in it is read out correspondingly.

Next, at step 205, the topic summary (summaries) in the topic summary information is presented to the user. Particularly, there can be a plurality of ways to present a topic summary. The most direct way is to list each topic and their corresponding topic summary. But, when there are a large number of topic summaries, it is also possible to let the user input a desired topic and select a topic closest to the user input topic, from the plurality of topics contained in said topic summary information, then to present the topic summary of said closest topic to the user.

Next, at step 210, the reader reviews the topic summary and determines whether he/she is interested in the document. If the reader is interested in the document, then a confirmation is made and the process proceeds to step 215, where the content of the document is presented to the reader. If the reader is not interested in the document, then the content of the document will not be displayed, and the process will proceed to step 220, ending with the document closed.

From the above description it can be appreciated that if the method for browsing an electronic document of the present embodiment is implemented, by using the topic summary information in an electronic document composed by the above mentioned method for aided authoring, it is possible to present the reader with the related topic summary verified by the writer before presenting the entire content of the document to the reader, so as to let the reader have an overview of the concerned topic in the document, whereby saving reader's time for reading.

Apparatus for Aided Authoring

Figure 3:
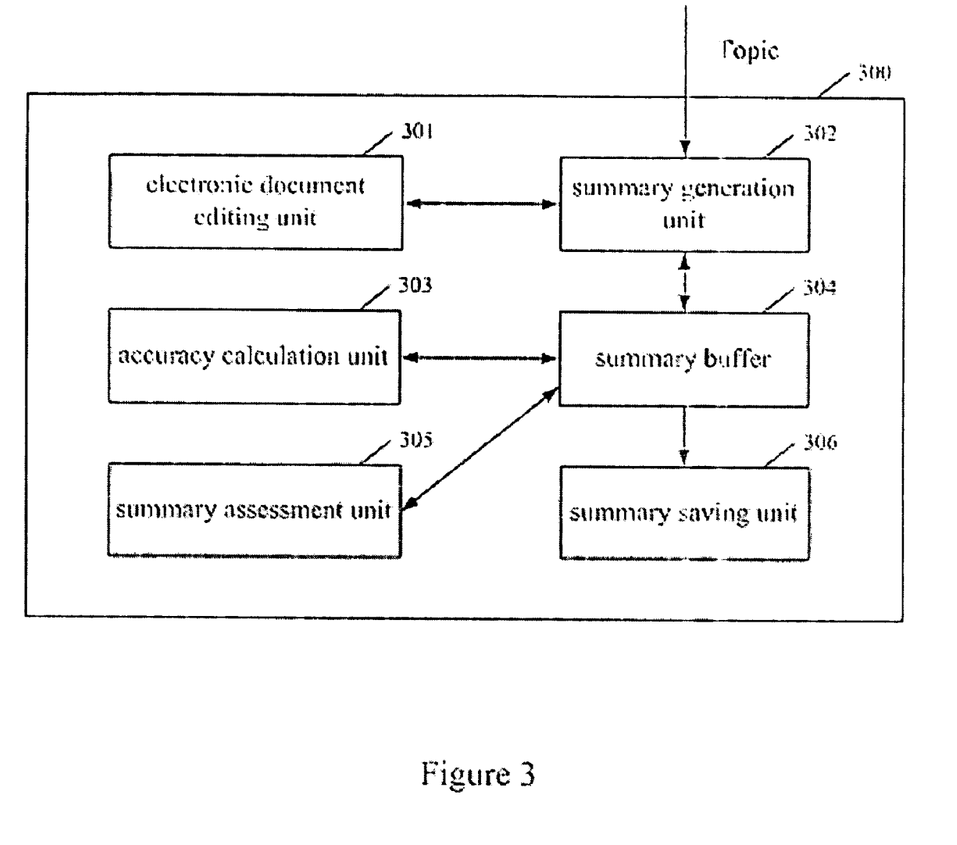
FIG. 3 is a block diagram illustrating the structure of an apparatus for aided authoring according to an embodiment of the present invention.

Under the same inventive conception, according to another aspect of the present invention, there is provided an apparatus for aided authoring. FIG. 3 is a block diagram illustrating the structure of the apparatus for aided authoring according to an embodiment of the present invention.

As shown in FIG. 3, the apparatus for aided authoring 300 includes: an electronic document editing unit 301 for editing an electronic document, it may be an standalone document editing unit, or may share an existing document editor, such as MS Word, WPS or the like; a summary generation unit 302 for extracting a topic summary from the electronic document according to an input topic; a summary saving unit 306 for saving topic summary information generated by said summary generation unit 302 in correspondence with said electronic document; and a summary assessment unit 305 for allowing the writer to evaluate and modify the topic summary generated by the summary generation unit 302; and a summary buffer 304 for temporarily storing the topic summary generated by the summary generation unit 302.

The apparatus for aided authoring 300 of the present embodiment may operationally perform the above-described method for computer aided authoring.

Accordingly, the apparatus for aided authoring 300 may further include: an accuracy calculation unit for evaluating the accuracy of said summary verified by the writer. Here the summary generation unit 302 may further include: sentence importance calculation means for calculating the importance of each sentence in said document; sentence relevance calculation means for calculating relevance of each sentence in said document to said topic; and sentence extraction means for extracting a predetermined number of sentences by combining said calculated importance and relevance of each sentence.

From the above description it can be appreciated that if the apparatus for aided authoring of the present embodiment is implemented, then it is possible to assist the writer to complete preparation of a plurality of topic summaries during the writer's writing. Without too much burden to the writer, the writer's understanding to the document (it is definitely the most accurate understanding) may be used to ensure the accuracy and readability of the generated topic summary. And, because a plurality of topic summaries may be generated for a document so as to sufficiently reflect the content of the document, when the topic summary information is used for retrieving and previewing, it can be more accurate and complete, so that high degree of satisfaction can be obtained from users.

Electronic Document Browser

Under the same inventive conception, according to another aspect of the present invention, there is provided an electronic document browser, the electronic document is the document generated through the above described method for computer aided authoring, that is, the topic summary information has been saved in correspondence with the document.

Figure 4:
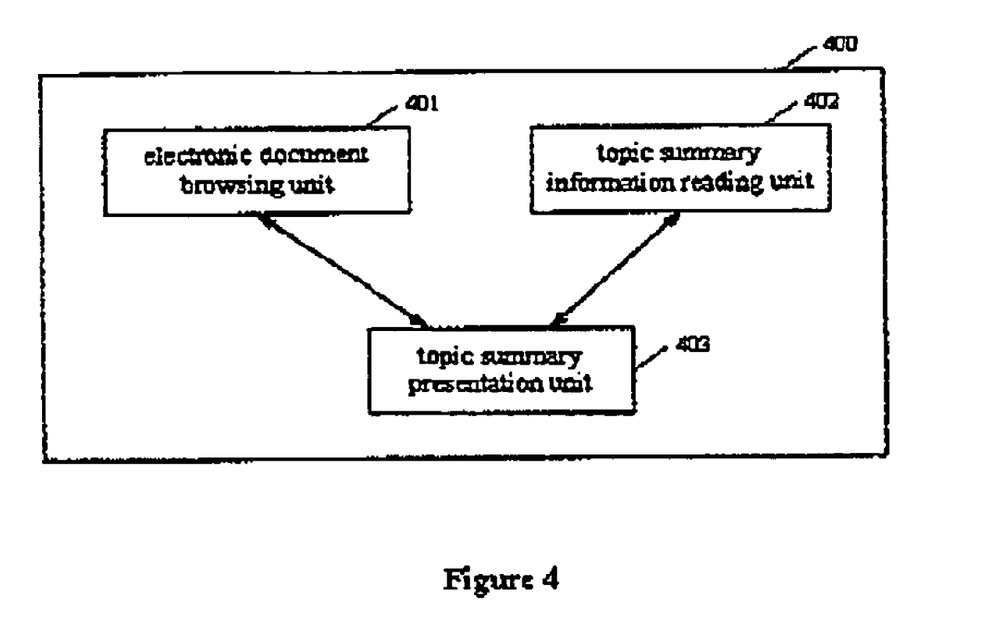
FIG. 4 is a block diagram illustrating the structure of an electronic document browser according to an embodiment of the present invention.

FIG. 4 is a block diagram illustrating the structure of an electronic document browser according to an embodiment of the present invention. As shown in FIG. 4, the electronic document browser 400 of the present embodiment includes: an electronic document browsing unit 401 for browsing the content of an electronic document, which may be a browser in the prior art, such as MS Internet Explorer, Netscape Navigator, Acrobat Reader or the like;

a topic summary information reading unit 402 for reading topic summary information saved in correspondence with said electronic document, particularly, the topic summary information is read out according to the way in which the topic summary information is saved, for instance, if the topic summary information is saved at the bottom of the document as a knowledge tag, then the knowledge tag is identified and the information in it is read out correspondingly;

a topic summary presenting unit 403 for presenting the user with the topic summaries contained in said topic summary information read out by the topic summary information reading unit 402, particularly, there may be a plurality of ways to present a topic summary. The most direct way is to list each topic and the corresponding topic summary sequentially. But, when there are a large number of topic summaries, it is also possible to let the user input a desired topic and select a topic, from the plurality of topics contained in said topic summary information, that is closest to the user input topic, then to present the topic summary of said closest topic to the user, at this time, the browser 400 further includes a topic selection unit (not shown) for selecting the topic closest to the user input topic from the plurality of topics contained in said topic summary information.

From the above description it can be seen that the electronic document browser can perform the above described method for browsing an electronic document. If the electronic document browser of the present embodiment is implemented, then by using the topic summary information in an electronic document composed by the above mentioned method for aided authoring, it is possible to present the reader with the related topic summary verified by the writer before presenting the entire content of the document to the reader, so as to let the reader have an overview of the concerned topic in the document, whereby saving the reader's time for reading.

Method for Retrieving an Electronic Document

Under the same inventive conception, according to another aspect of the present invention, there is provided a method for retrieving an electronic document, herein the electronic document is the document generated through the above described method for computer aided authoring, that is, the topic summary information has been saved in correspondence with the document.

Figure 5:
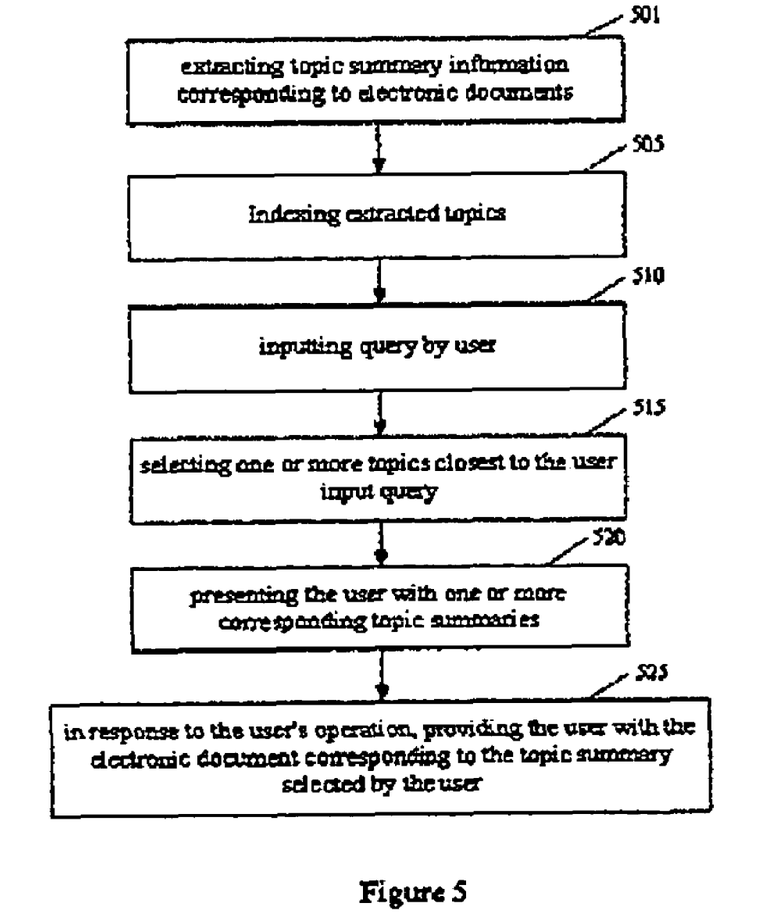
FIG. 5 is a flowchart showing a method for retrieving an electronic document according to an embodiment of the present invention.

FIG. 5 is a flowchart showing the method for retrieving an electronic document according to an embodiment of the present invention. As shown in FIG. 5, first at step 501, a plurality pieces of topic summary information corresponding to a plurality of electronic documents are extracted, each piece of said topic summary information contains one or more topics and their corresponding topic summaries. Particularly, if the writers of the electronic documents wrote the documents with the above described apparatus for aided authoring 300, then each electronic document will have a piece of topic summary information in correspondence with the document. At the present step, it is to extract the topic summary information of a plurality of electronic documents. In particular, for the electronic documents published on the Internet, a web crawler may be used to crawl over each electronic document and extract the corresponding topic summary information, e.g., from the knowledge tag.

Next, at step 505, the topics in the extracted topic summary information are indexed. Here, various indexing methods commonly used in the field of information retrieving may be utilized to index the topics in the topic summary information, such as, reverse file, signature file, PAT tree, PAT array or the like.

Next, at step 510, a query is input by the user. Similar to a topic, a user's query may comprise one or more terms or questions.

Next, at step 515, one or more topics that are close to the query inputted by the user are found out. Particularly, this step may include: calculating relevance degrees of each topic in the topic index with user input query and selecting a topic with the highest relevance degree or topics with the relevance degrees higher than a predetermined threshold.

Next, at step 520, said one or more closest topics and their corresponding topic summaries are presented to said user; and at step 525, when if the user selects one of the topic summaries, the electronic document or its link corresponding to the user selected topic summary is provided to the user.

From the above description it can be appreciated that the method for retrieving an electronic document of the present embodiment may use the topic summary information in an electronic document composed by the above mentioned method for aided authoring to extract the topic summary information for user's search. Because the topics and their corresponding summaries in the topic summary information have been verified by the writer, their accuracy and readability can be ensured, thus the method for retrieving an electronic document of the present embodiment is more accurate, and before presenting the entire content of the document to the reader, the reader will be presented with the related topic summary verified by the writer, so as to let the reader have an overview of the concerned topic in the document, whereby saving the reader's time for searching.

Figure 6:
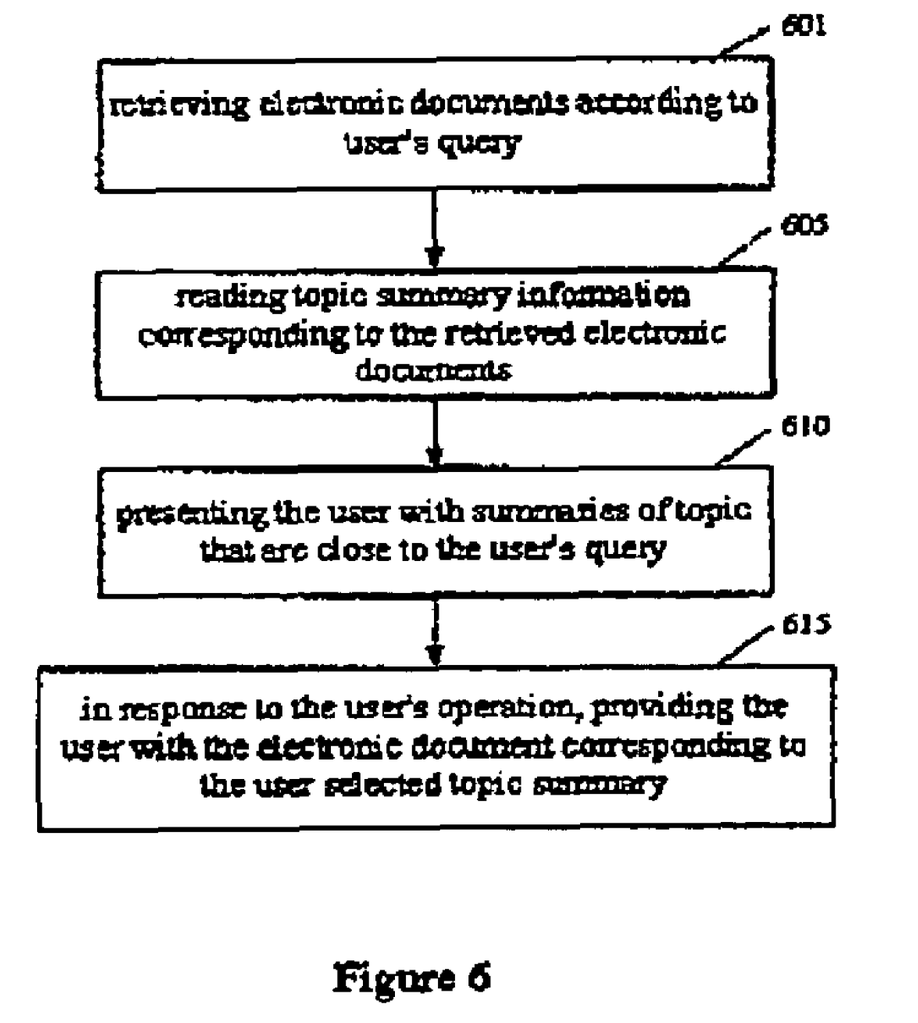
FIG. 6 is a flowchart showing a method for retrieving an electronic document according to another embodiment of the present invention.

FIG. 6 is a flowchart showing the method for retrieving an electronic document according to another embodiment of the present invention, in which the electronic document is the document generated through the above described method for computer aided authoring, that is, topic summary information has been saved in correspondence with the document.

The method as shown in FIG. 6, similar to the method for retrieving an electronic document in the prior art, in which at step 601, the electronic document is searched according to user's query, for example, by using existing full-text retrieval, term retrieval or the like.

The difference is that when the user is provided with a preview of the retrieving result, first, at step 605, the topic summary information corresponding to the found electronic documents is read out, wherein each piece of said topic summary information contains one or more topics and their corresponding topic summaries.

Next, at step 610, the user is presented with the topic summary, contained in each piece of said topic summary information, of one topic which is closest to said user's query. The method for determining a closest topic has been described above and is omitted here.

Then, at step 615, if the user selects one of the topic summaries, then said user is provided with the electronic document or its link corresponding to the topic summary selected by the user.

From the above description it can be seen that the method for retrieving an electronic document of the present embodiment may use the topic summary information in an electronic document composed by the above mentioned method for aided authoring, before presenting the entire content of the document to the reader, the reader will be presented with the related topic summary verified by the writer, so as to let the reader have an overview of the concerned topic in the document, whereby saving the reader's time for searching.

System for Retrieving Electronic Documents

Under the same inventive conception, according to another aspect of the present invention, there is provided a system for retrieving electronic documents, wherein the electronic documents are the documents generated through the above described method for computer aided authoring, that is, topic summary information has been saved in correspondence with the document.

Figure 7:
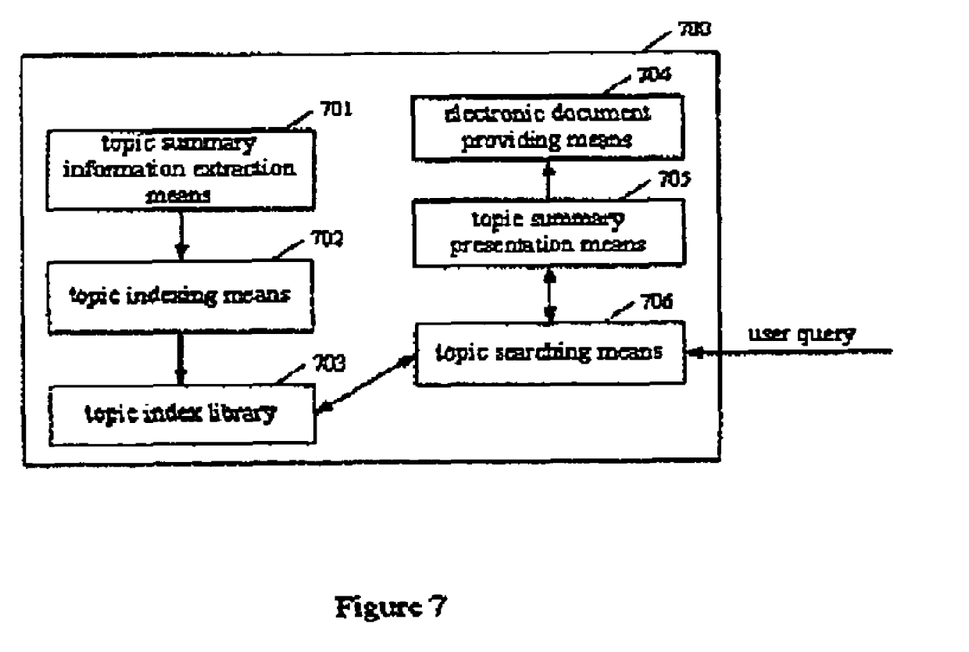
FIG. 7 is a block diagram illustrating the structure of a system for retrieving an electronic document according to an embodiment of the present invention.

Corresponding to the method for retrieving electronic documents illustrated in FIG. 5, FIG. 7 is a block diagram showing the structure of a system for retrieving electronic documents according to an embodiment of the present invention.

As shown in FIG. 7, a system for retrieving electronic documents 700 includes: a topic summary information extraction means 701 for extracting topic summary information corresponding to a plurality of electronic documents, respectively, each piece of said topic summary information contains one or more topics and their corresponding topic summaries, as mentioned above, the topic summary information extraction means 701 can be a web crawler for crawling over each electronic document on the network and extracting the corresponding topic summary information; a topic indexing means 702 for indexing the topics in said extracted topic summary information; a topic index library 703 for storing the topic index prepared by said topic indexing means 702; a topic searching means 706 for searching said topic index library 703 for one or more topics that are closest to the user input query; a topic summary presentation means 705 for presenting said user with one or more topics found by the topic searching means 706 and the corresponding topic summaries; and an electronic document providing means 704 for providing said user with the electronic document or its link corresponding to the topic summary selected by said user.

Furthermore, the system for retrieving electronic documents 700 may further include: relevance calculation means (not shown) for calculating the relevance degree between two strings of words; thereby, said topic searching means 706 uses said relevance calculation means to calculate the relevance degrees of the user input query with each topic in the topic summary, and to select a predetermined number of topics with highest relevance degrees or topics with relevance degrees higher than a predetermined threshold.

From the above description it can be appreciated that the system for retrieving electronic documents of the present embodiment can perform the method for retrieving an electronic document described above in conjunction with FIG. 5, the topic summary information in electronic documents composed by the above-mentioned method for aided authoring can be used for user's search. Since the topics and their corresponding summaries in the topic summary information have been verified by writers, their accuracy and readability can be ensured, thus the system for retrieving electronic documents of the present embodiment can retrieve information more accurately, and before presenting the entire content of the documents to the reader, the reader will be presented with the related topic summary verified by the writer, so as to let the reader have an overview of the concerned topic in the document, whereby saving the reader's time for searching.

In addition, in order to implement the method for retrieving shown in FIG. 6, a retrieving system in the prior art that searches one or more electronic documents according to a user input query may further comprise: a topic summary reading means for reading topic summary information corresponding to the electronic documents found by the system, wherein each piece of the topic summary information contains one or more topics and their corresponding topic summaries; a topic summary presentation means for presenting said user with the topic summaries of one topic that is closest to said user's query, contained in each piece of the topic summary information; and an electronic document providing means for providing said user with the electronic document or its link corresponding to a topic summary selected by said user.

Furthermore, the retrieving system may also include a relevance calculation means for calculating the relevance degree between two strings of words, thereby said topic summary presentation means uses said relevance calculation means to calculate, for each piece of said topic summary information, the relevance degrees of the user input query with said topic in the topic summary information, and to present the topic summary of the topic with highest relevance degree to said user.

The system for retrieving electronic documents of the present embodiment may perform the method for retrieving an electronic document described above in conjunction with FIG. 6, it may use the topic summary information in an electronic document composed by the above mentioned method for aided authoring, before presenting the entire content of the document to the reader, the reader will be presented with the related topic summary verified by the writer, so as to let the reader have an overview of the concerned topic in the document, whereby saving the reader's time for searching.

Method and System for Subscribing and Publishing an Electronic Document

Under the same inventive conception, according to another aspect of the present invention, there is provided a method and system for subscribing and publishing electronic documents, wherein the electronic documents are the documents generated by the above described method for computer aided authoring, that is, topic summary information has been saved in correspondence with the documents.

Usually, a publish/subscribe system comprises a content provider, subscriber clients and a publishing-subscribing server. The content provider generates the contents published through the publishing-subscribing system. The content provider sends structural contents to the publishing-subscribing system. A subscriber client sends a subscribing request to the publishing-subscribing server. The publishing-subscribing server records the desired topics for the subscriber in the form of a subscriber profile. The subscriber receives content from the publishing-subscribing server. The actually received content will depend on the process of subscribing and messaging. The co-applicant Chinese patent application entitled "Method and apparatus for receiving electronic messages from a publish/subscribe service" (application number: 03149816.7) discloses such a publishing-subscribing system and method, which is entirely incorporated herein by reference.

Figure 8:
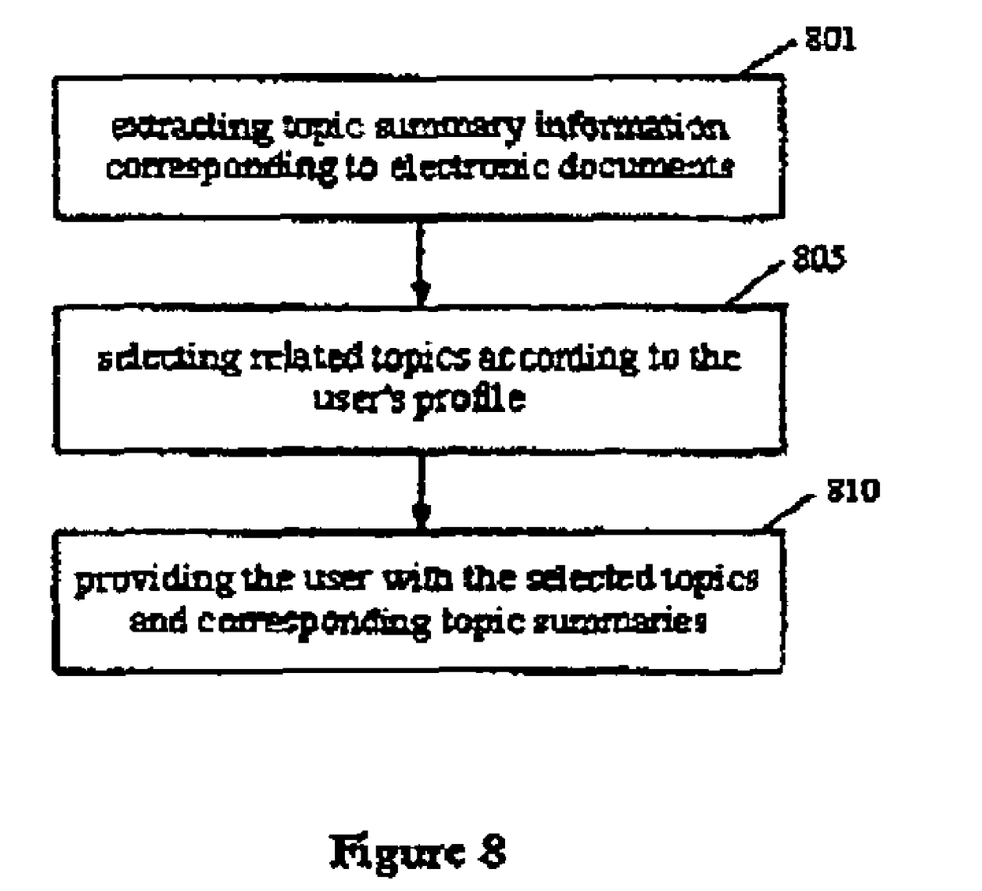
FIG. 8 is a flowchart showing a method for subscribing and publishing electronic documents according to an embodiment of the present invention.

FIG. 8 is a flowchart illustrating the method for subscribing and publishing electronic documents according to an embodiment of the present invention. As shown in FIG. 8, first at step 801, the topic summary information corresponding to a plurality of electronic documents is extracted, wherein each piece of the topic summary information contains one or more topics and their corresponding topic summaries. Similar to the above described step 501 shown in FIG. 5, if the writer of the electronic document writes a document using the above described apparatus for aided authoring 300, then the electronic document will have a piece of topic summary information in correspondence with the document. At the present step, it is to extract the topic summary information of a plurality of electronic documents. In particular, for the electronic documents published on the Internet, a web crawler may be used to crawl over each electronic document and extract the corresponding topic summary information, such as, from the knowledge tag.

Next, at step 805, the topic summary information extracted in previous step is regarded as the source for selection, and related topics are selected based on the subscriber's profile. Particularly, for instance, the relevance degrees of the subscribed topics in the subscriber's profile with each topic in said topic summary information may be calculated first, then the topics with relevance degrees higher than a predetermined threshold and their corresponding topic summaries are selected. Here, the main difference between the method for subscribing and publishing electronic documents of the present invention and the prior art is in that the method of the present invention takes topic summary information as the source for selection. As to the selection process, various known ways can be used, such as the way disclosed in the Chinese patent application No. 03149816.7.

Then, at step 810, the selected topics and their corresponding summaries are published to the subscriber.

From the above description it can be appreciated that the method for subscribing and publishing electronic documents of the present embodiment can use the topic summary information in electronic documents composed by the above mentioned method for aided authoring and extract the topic summary information for selecting summaries that match the subscriber's profile. Since the topics and their corresponding summaries in the topic summary information have been verified by the writer, their accuracy and readability is ensured, thus the method for subscribing and publishing electronic documents of the present embodiment is more accurate.

Figure 9:
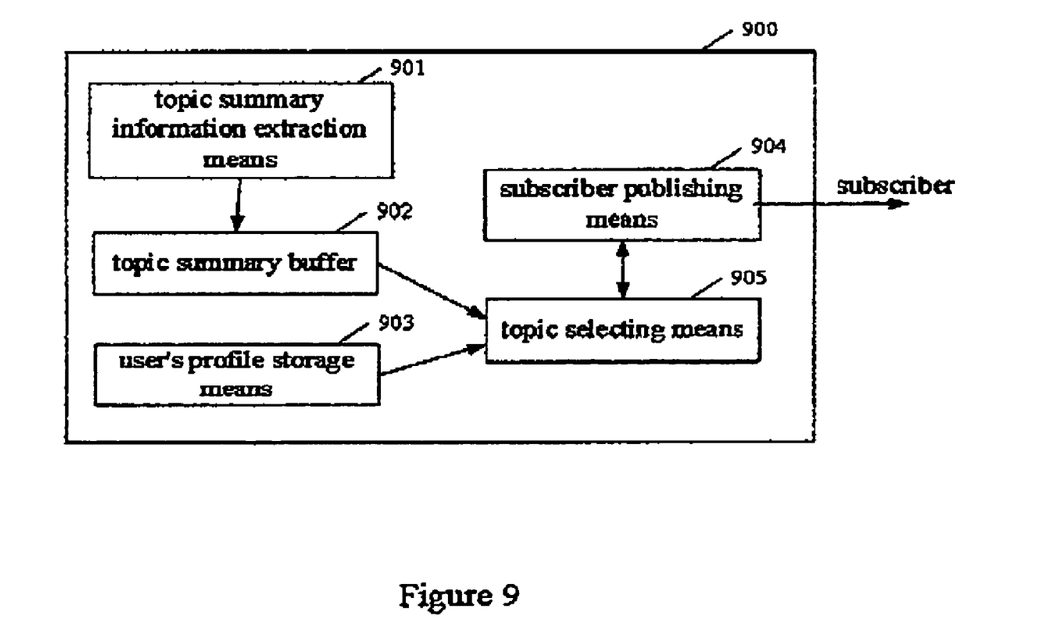
FIG. 9 is a block diagram illustrating the structure of a system for subscribing and publishing electronic documents according to an embodiment of the present invention.

FIG. 9 is a block diagram illustrating the structure of a system for subscribing and publishing electronic documents according to an embodiment of the present invention. As shown in FIG. 9, the system for subscribing and publishing electronic documents, includes: a subscriber profile storage means 903 for storing a profile for a subscriber that contains a subscribed topic desired by said subscriber; a topic summary information extraction means 901 for extracting topic summary information corresponding to a plurality of electronic documents, respectively, each piece of said topic summary information contains one or more topics and their corresponding topic summaries; a topic summary buffer 902 for temporarily storing the topic summary information extracted by the topic summary information extraction means 901; a topic selecting means 905 for selecting related topics stored in the topic summary buffer 902 and their corresponding topic summaries according to the subscribed topic in the subscriber's profile stored in the subscriber profile storage means 903; publishing means 904 for publishing topic summaries selected by the topic selecting means 905 to said subscriber.

Furthermore, the system for subscribing and publishing electronic documents 900 may further include a relevance calculation means (not shown) for calculating the relevance degree between two strings of words. The topic selecting means 905 uses the relevance calculation means to calculate the relevance degrees of the subscribed topic in the subscriber's profile with each topic in the extracted topic summary information and to select topics with relevance degrees higher than a predetermined threshold and their corresponding topic summaries.

The system for subscribing and publishing of the present embodiment may implement the above described method for subscribing and publishing electronic documents, whereby the desired information may be published to the subscriber more accurately.

The above described apparatus for aided authoring, electronic document browser, system for retrieving electronic documents, system for subscribing and publishing electronic documents as well as their respective components can be implemented in the form of hardware and software, and can be combined with other means as needed, such as, they can be implemented on a personal computer, a notebook computer, a palmtop computer, a PDA, a word processor and other devices with computing functionality, and they can be physically separated from each other and operationally interconnected with each other.

Though a method for computer aided authoring, a method for browsing an electronic document, a system for aided authoring, an electronic document browser, a method for retrieving an electronic document, a system for retrieving electronic documents, a method for subscribing and publishing an electronic document as well as a system for subscribing and publishing electronic documents have been described in details through some exemplary embodiments, these embodiments are not exhaustive. Those skilled in the art may make various variations and modifications within the spirit and scope of the present invention. Therefore, the present invention is not limited to these embodiments, and the scope of the present invention is only defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for computer aided authoring, comprising:
when a writer is writing an electronic document, generating one or more topic summaries based on said electronic document; and
saving said topic summary information in correspondence with said electronic document, wherein:
said step of generating one or more topic summaries comprises, for each of the topic summaries:
inputting or generating a topic, wherein said topic contains one or more topic terms; and
extracting a summary from said electronic document according to said topic;
said step of generating one or more topic summaries further comprises verifying said extracted summary;
said step of generating one or more topic summaries further comprises evaluating the accuracy of said verified summary;

said step of saving said topic summary further comprises saving information about the accuracy of said summary; and said step of evaluating the accuracy of said verified summary comprises:

generating a plurality of referential summaries for said topic by means of summary generation methods;

calculating relevance degrees between said verified summary with said generated plurality of referential summaries; and calculating the accuracy of said verified summary based on the relevance degrees.

2. The method for computer aided authoring according to claim 1, wherein said step of extracting a summary from said electronic document according to said topic comprises:

calculating an importance of each sentence in said document;

calculating a relevance to said topic for each sentence in said document; and by combining said calculated importance and relevance of each sentence, selecting a predetermined number of sentences as the summary of said topic.

3. The method for computer aided authoring according to claim 1, further comprising:

from neighboring sentences of selected sentences, selecting one or more sentences having high relevance with said selected sentences to incorporate into the summary of said topic.

4. The method for computer aided authoring according to claim 1, wherein said step of saving said topic summary information in correspondence with said electronic document comprises:

saving said topic summary information in said electronic document as a knowledge tag.

5. The method for computer aided authoring according to claim 1, wherein said step of saving said topic summary information in correspondence with said electronic document comprises:

saving said topic summary information as a knowledge tag file associated with said electronic document.

6. An article of manufacture comprising a computer usable medium having computer readable program code means embodied therein for causing the subscribing and publishing of electronic documents, the computer readable program code means in said article of manufacture comprising computer readable program code means for causing a computer to effect the steps of claim 1.

* * * * *